(12) United States Patent
Sun et al.

(10) Patent No.: US 12,210,756 B2
(45) Date of Patent: Jan. 28, 2025

(54) MEMORY SYSTEM, OPERATING METHOD AND CONTROLLER

(71) Applicant: Taiwan Semiconductor Manufacturing Company, Ltd., Hsinchu (TW)

(72) Inventors: Xiaoyu Sun, Hsinchu (TW); Kerem Akarvardar, Hsinchu (TW); Rawan Naous, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 118 days.

(21) Appl. No.: 17/740,378

(22) Filed: May 10, 2022

(65) Prior Publication Data
US 2023/0367497 A1   Nov. 16, 2023

(51) Int. Cl.
*G06F 3/06* (2006.01)

(52) U.S. Cl.
CPC ............ *G06F 3/064* (2013.01); *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2010/0180073 A1* | 7/2010 | Weingarten | ......... | G06F 12/0246 711/E12.001 |
| 2012/0054581 A1* | 3/2012 | Grube | ................... | G06F 3/0679 714/769 |
| 2018/0285727 A1* | 10/2018 | Baum | ........................ | G06F 5/01 |
| 2018/0307432 A1* | 10/2018 | Battaje | .................... | G06F 3/067 |

* cited by examiner

*Primary Examiner* — Yaima Rigol
*Assistant Examiner* — Alexander J Yoon
(74) *Attorney, Agent, or Firm* — JCIPRNET

(57) ABSTRACT

A memory system, an operating method and a controller are provided. The memory system comprises a memory array and a controller. The memory array comprises a probing memory block and a plurality of memory blocks. The controller is configured to perform; write a probing data to the probing memory block; detect a strength of the probing data from the probing memory block to obtain an aging condition of the memory array; and control each memory block to be enabled or disabled according to the aging condition.

20 Claims, 14 Drawing Sheets

T0

$$X\{[x1\ x2\ x3]\quad H\left\{\begin{bmatrix}h11 & h12\\ h21 & h22\\ h31 & h32\end{bmatrix}\right.\quad I\left\{\begin{bmatrix}i11 & i12\\ i21 & i22\end{bmatrix}\right.=\begin{bmatrix}y1\\ y2\end{bmatrix}\}Y$$

T1

$$X\{[x1\ x2\ x3]\quad H'\left\{\begin{bmatrix}h11' & h12' & h13\\ h21' & h22' & h23\\ h31' & h32' & h33\end{bmatrix}\right.\quad I'\left\{\begin{bmatrix}i11' & i12'\\ i21' & i22'\\ i31 & i32\end{bmatrix}\right.=\begin{bmatrix}y1\\ y2\end{bmatrix}\}Y$$

T2

$$X\{[x1\ x2\ x3]\quad H''\left\{\begin{bmatrix}h11'' & h12'' & h13' & h14\\ h21'' & h22'' & h23' & h24\\ h31'' & h32'' & h33' & h34\end{bmatrix}\right.\quad I''\left\{\begin{bmatrix}i11'' & i12''\\ i21'' & i22''\\ i31' & i32'\\ i41 & i42\end{bmatrix}\right.=\begin{bmatrix}y1\\ y2\end{bmatrix}\}Y$$

FIG. 3

MEMORY SYSTEM, OPERATING METHOD AND CONTROLLER

BACKGROUND

With the developments of artificial intelligence (AI), computing-in-memory (CiM) operation has been widely used for accelerating computation speed of computers. However, accuracy of the CiM operation performed by non-volatile memory devices has suffered from aging, which requires calibration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 illustrates a mathematical representation of the CiM operation performed by the neural network as illustrated in FIG. 2C under different predetermined aging conditions in accordance with some embodiments of the present disclosure.

DESCRIPTION OF THE EMBODIMENTS

Figure 1:
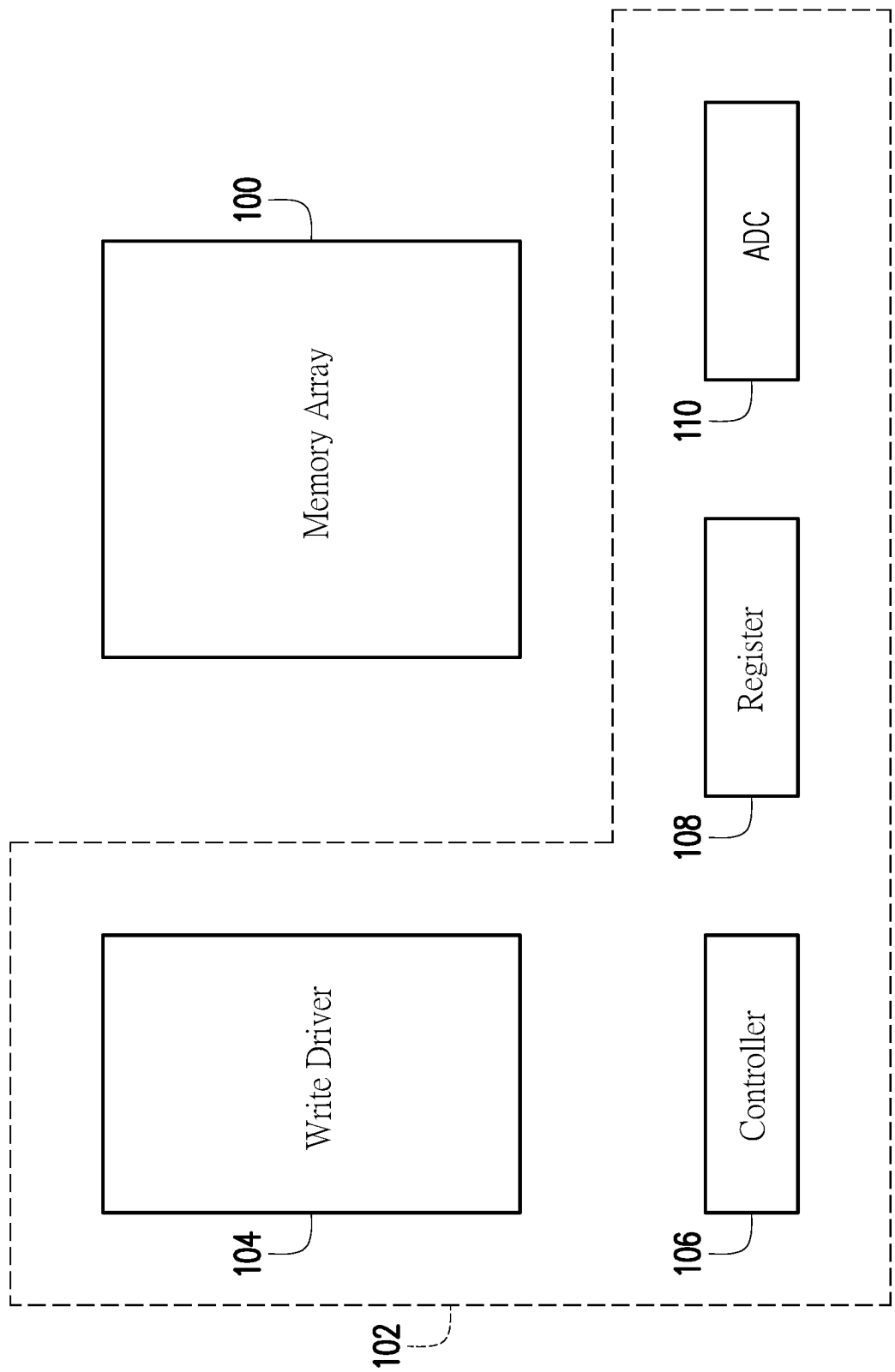
FIG. 1 illustrates a schematic block diagram of a memory system according to some embodiments of the present disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a schematic block diagram of a memory system 1 according to some embodiments of the present disclosure. The memory system 1 comprises a memory array 100 and a control circuit (also referred as a controller) 102 coupled to the memory array 100. In some embodiments, the memory system 1 is integrated and disposed on a single die and being implemented through system on a chip (SOC) manner. In some embodiments, the memory system 1 is included as a part of a larger IC device which comprises circuitry other than the memory system for other functionalities. In some embodiments, the memory system 1 is disposed on at least one chips. For example, the memory array 100 and the control circuit 102 may be disposed on different chips.

In some embodiments, the control circuit 102 is configured to obtain an aging condition of the memory array 100 and control operations of the memory array 100 according to the obtained aging information. Specifically, the memory array 100 may be programmed to store weights of neurons of a neural network for performing a computing-in-memory (CiM) operation. However, under different aging conditions, the weights stored in the memory array 100 are diversed, which leads to accuracy degradation of the memory system 1. For example, the memory array 100 ages and the data stored by the memory array 100 varies as an operation time or an operating temperature increase. In order to maintain computation accuracy of the memory system 1, the control circuit 102 is configured to program a probing data to the memory array 100 and detect a strength of the probing data stored by the memory array 100 to obtain the aging information of the memory array 100. In addition, the memory array 100 is divided in to multiple memory blocks, and corresponding memory blocks are enabled and/or disabled by the control circuit 102 when the aging condition is determined to meet a predetermined aging condition. As such, the control circuit 102 is capable of compensating the neurons with drifted weights by adding or cutting the memory blocks for computation. Therefore, computation of the memory array 100 by executing the neural network having neurons with the drifted weights which causes accuracy degradation may be compensated by the neurons added and/or cut. The aging condition may carry information that related to factors which affecting data stored in the memory array 100 to be varied. For example, the aging condition may include, but not limited to, an operating time, an operating temperature, an accessed count, and/or other suitable information capable of estimating to what extent the memory array 100 has aged due to usage or environment. Under such a circumstance, the control circuit 102 may obtain the aging condition by detecting the probing data stored in the memory array 100, so the aging condition may be applied to the to evaluate whether the weights stored in the memory array 100 are varied or not. When the aging condition is determined to meet the predetermined aging condition, certain memory block of the memory array 100 is enabled and added into computation by the control circuit 102 for compensating the neurons with varied weights stored in the memory array 100.

In the exemplary configuration of FIG. 1, although it is not illustrated, the memory array 100 comprises a probing memory block and a plurality of memory blocks. The probing memory block is configured to store the probing data and the plurality of memory blocks is configured to store weights of neurons for computation. In the probing memory block and the plurality memory blocks of the memory array 100, a plurality of memory cells are disposed inside and arranged in columns and rows. Each memory cell may comprise an access transistor and at least one memory element. Electrical characteristics (e.g., resistance or threshold voltage) of each memory element can be programed in different levels. Therefore, the memory cell is capable of storing weight by programming electrical characteristics of the memory element into a corresponding level. In some embodiments, the memory cell in the memory array 100 is a multi-level cell (MLC), a tri-level cell (TLC) a quadra-level cell (QLC), or the like. In some embodiments, a memory system 1 comprising a plurality of described memory cells is configured as an MLC or TLC or QLC memory for storing weight.

In some embodiments, in each memory cell, the access transistor is serially connected to the at least one memory element. The access transistor may be controlled to be operated under conducted or cutoff, and thus the at least one memory element may be programmed and/or read out according to operations of the access transistor. In some embodiments, the memory cell may receive an input data to generate a corresponding computation result based on what level of the electrical characteristic of the memory element is programmed. Therefore, each memory cell may be programmed at a level corresponding to weight, and input data may be provided to the memory array 100 for performing the CiM operation. In at least one embodiment, it is possible to achieve one or more advantages including, but not limited to, larger memory window, better computation performance, or the like.

The memory array 100 further comprises a plurality of word lines, a plurality of source lines, and a plurality of bit lines extending along the columns of the memory array 100. Each of the memory cells is coupled to the control circuit 102 by a corresponding source line, a corresponding bit line, and a corresponding word line. The word lines are configured for transmitting addresses of memory cells, or memory elements in the memory cell, to be read from, and/or to be written to, or the like. The word lines are sometimes referred to as "address lines." The bit lines and/or the source lines are configured for transmitting data to be written to, and/or read from, the memory cells, or memory elements in the memory cell, indicated by the addresses on the corresponding word lines, or the like. The bit lines are and/or the source lines sometimes referred to as "data lines." Various numbers of word lines and/or bit lines and/or source lines in the memory array 100 are within the scope of various embodiments.

Examples of memory elements, which are programmable to have different electrical characteristic values, include, but are not limited to, non-volatile memories, such as resistive random-access memory (ReRAM or RRAM), magnetic RAM (MRAM), phase change memory (PCM), flash memory comprising charge storage material or floating gate, or the like. Both NOR and NAND gate flash memories are applicable to implement memory elements of the memory cell in one or more embodiments. An RRAM, MRAM or PCM memory cell comprises the access transistor electrically coupled in series with the memory element having a memory layer. The memory layer is programmable to have two or more states corresponding to two or more resistance values of the memory element. The gate of the access transistor of the RRAM. MRAM or PCM memory element corresponds to a control terminal of the memory element, and is electrically coupled to a corresponding word line. A flash memory element comprises a transistor having a floating gate or a charge storage layer. The floating gate or charge storage layer is programmable to store two or more level of charges corresponding to two or more resistance values of the memory element. The gate of the transistor of the flash memory element corresponds to a control terminal of the memory element, and is electrically coupled to a corresponding word line. Other types or configurations of memory elements are also within the scopes of various embodiments.

In some embodiments, the control circuit 102 is coupled to the memory array 100. The control circuit 102 is configured to perform at least one of the write operation and/or the read operation to the memory array 100. The control circuit 102 is configured to program the memory array 100 to store weights by performing the write operation to the memory array 100. The memory array 100 may receive inputs for generating computation results based on the weights stored. In addition, the control circuit 102 is configured to obtain the computation results by performing the read operation to the memory array 100. Moreover, the control circuit 102 may obtain the aging condition of the memory array 100, and control each memory block to be enabled and/or disabled according to the aging condition. Therefore, the control circuit 102 may compensate the neurons with the drifted weights under different aging condition by adding memory blocks for computation.

The control circuit 102 comprises a write driver 104, a controller 106, a register 108 and an analog to digital converter (ADC) 110. In at least one embodiment, the control circuit 102 further includes one or more clock generators for providing clock signals for various components of the memory system 1, one or more input/output (I/O) circuits for data exchange with external devices, and/or one or more controllers for controlling various operations in the memory system 1.

The write driver 104 is coupled to the memory cells of the memory array 100 through the bit lines and the source lines to perform the write operation to at least one memory cell of the memory array 100. In at least one embodiment, the control circuit 102 further includes a word line driver (also referred as "word line decoder") coupled to the memory array 100 via the word lines. The word line driver is configured to decode a row address of a selected memory cell, selected to be accessed in a read operation or a write operation.

The register 108 is coupled to the controller 106. The register 108 may store configuration data of the memory array 100. For example, the register 108 may store configuration data such as write current and/or read voltage and/or verify threshold voltage, or the like, which may be used for programming electrical characteristics of the memory array 100 and/or identifying the data readout from the memory array 100. In addition, the register 108 may store a table recording relationships between a plurality of predetermined strengths and predetermined aging conditions. The table may be accessed by the controller 106 on referencing to what extent the memory array 100 has been aged. In some embodiments, the predetermined aging condition may be a predetermined time length, a predetermined temperature, a predetermined accessed count, and/or other suitable index used for estimating to what extent the memory array 100 has aged due to usage or environment. In some embodiments, the register 108 may store a lookup table comprising the aforementioned information.

The ADC 110 is coupled to the memory array 110 for converting computation results from analog to digital. In some embodiments, the memory array 100 may sum up the computation results by accumulating the current generated by each memory cell for performing the CiM operation. Therefore, the computation results generated by the memory array 100 are represented in an analog manner. The ADC 110 is configured to receive the analog computation results and converting them into digital manner.

Although not illustrated in FIG. 1, the control circuit 102 further comprises a multiplexer and a sense amplifier (SA). The MUX is coupled to the memory cells of memory array 100 through bit lines to perform the read operation to at least one memory cell of the memory array 100, and the MUX is coupled to the sense amplifier through MUX. In some embodiments, the MUX selects the bit lines corresponding to the selected memory cell selected by the word line driver for reading. The sense amplifier is coupled to the MUX. The sense amplifier is configured to amplify electrical signals, e.g. voltage or current signals, generated by at least one selected memory cell through selection of the MUX, and provide the amplified electrical signal to the ADC 110.

The controller 106 is coupled to the write driver 104, the register 108, the ADC 110, the MUX and the sense amplifier. The controller 106 is configured to access configuration data stored in the register 108 for controlling the write driver 104, the MUX and the SA to perform at least one of the write operation and the read operation to the memory cells in the memory array 100.

In some embodiments, the controller 106 is configured to control a write operation to write a probing data to the probing memory block of the memory array 100. The probing data stored in the probing memory block is detected by the controller 106 to obtain the aging information of the memory array 100 to evaluate whether weights stored in the memory array 100 have been drifted under different aging conditions. In some embodiments, how the controller 106 detecting the probing data is to detect a strength of the probing data. The controller 106 may further access the register 108 to obtain a table which recording a plurality of predetermined strengths respectively corresponding to a plurality of predetermined aging conditions. Therefore, the controller 106 may compare the detected strength of the probing data with the plurality of predetermined strengths to determine whether the plurality of predetermined aging conditions are met. For example, data stored in the memory array 100 may be affected by an operating time, an operating temperature, an accessed count, and/or other factors. The controller 106 may detect the strength of the probing data stored in the memory array to evaluate how the memory array 100 is affected by the factors of aging at least mentioned above. Therefore, when it is determined that a certain predetermined aging condition is met, the controller 106 is capable of taking corresponding actions to control each memory block of the memory array 100 to be enabled or disabled, so data degradations resulted from aging may be compensated or canceled. More particularly, the controller 106 controls each memory block to be enabled or disabled under different aging conditions in order to compensate the model having the neurons, whose weights are drifted by aging, stored in the memory array 100, so as to add additional neurons into computation when aging occurs.

Example controller 106 include, but are not limited to, a central processing unit (CPU), a microprocessor, a microcontroller unit (MCU), an application specific integrated circuit (ASIC), a graphics processing unit (GPU), a field programmable gate array (FPGA), an advanced RISC machine or combinations thereof. In addition, the controller 106 may also be implemented through synthesis using hardware description language (HDL), such as high-speed hardware description language (VHDL). Verilog or the like.

In a write operation, a selected memory cell is configured to be supplied with a write voltage through a corresponding word line. Further, a low voltage is also provided to the selected memory cell through a corresponding bit line and a corresponding source line of by the write driver 104. Therefore, sufficiently large voltage difference is provided to the selected memory cell for performing the write operation. For those unselected memory cells, a high voltage is provided to the corresponding bit lines of the unselected memory cells. Therefore, insufficiently large voltage is received by those unselected memory cells.

In a read operation, the write driver 104 is configured to supply a read voltage to the selected word line. The MUX is configured to select the bit line corresponding to the selected memory cell for reading. The sense amplifier is configured to sense data read from the accessed memory cell and retrieved through the selected bit line BL.

Figure 2A:
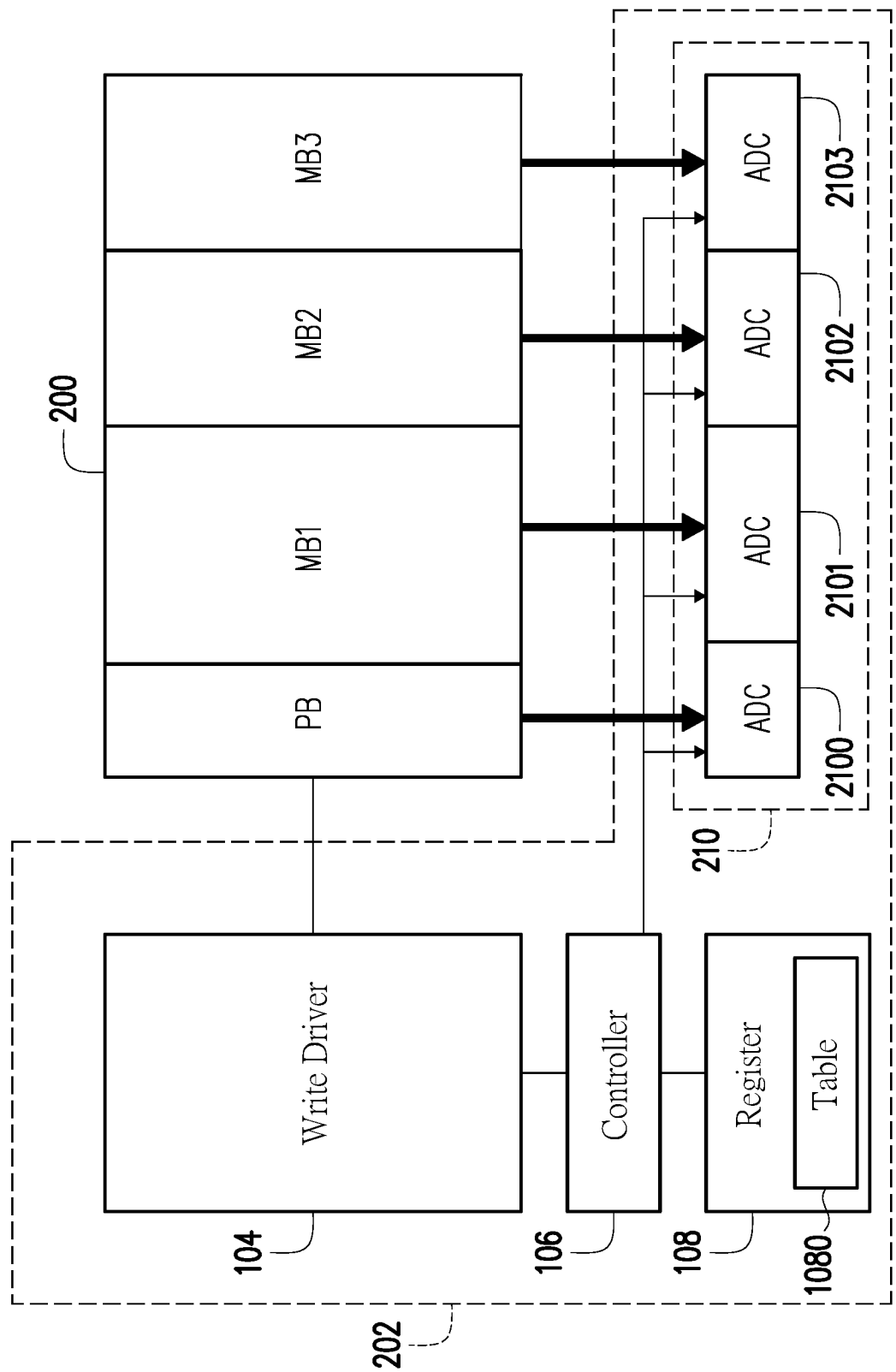
FIG. 2A illustrates a schematic block diagram of a memory system according to some embodiments of the present disclosure.

FIG. 2A illustrates a schematic block diagram of a memory system 2 according to some embodiments of the present disclosure. The memory system 2 comprises the memory array 200 and the control circuit 202. The memory array 200 are divided into a probing memory block PB, first to third memory blocks MB1-MB3. The control circuit 202 comprises a write driver 104, a controller 106, a register 108, and an ADC 210.

The memory array 200 is divided into the probing memory block PB, the first to third memory blocks MB1-MB3, and each of the first to third memory blocks MB1-MB3 is controlled to be enabled and/or disabled corresponding to different aging conditions. Correspondingly, the ADC 210 coupled to the memory array 200 are also divided into ADC blocks 2100-2103, respectively coupled to the probing memory block PB, the first to third memory blocks MB1-MB3. The controller 106 controls the enable and/or disable of each of the ADC blocks ADC 2100-2103.

In some embodiments, initially, the probing memory block PB and the memory array 200 are programmed by the write driver 104 simultaneously or within a same time region. The probing memory block PB is programmed to store the probing data, and the first to third memory blocks MB1-MB3 are programmed to stored weights of the neurons in a neural network. Since the probing memory block PB and the first to third memory blocks MB1-MB3 are programmed the same time region, data degradation of the probing memory block PB and the first to third memory blocks MB1-MB3 would be similar or identical. Therefore, how the data stored in the first to third memory blocks MB1-MB3 may be evaluated by detecting the probing data stored in the probing memory block PB. In some embodiments, the controller 106 may periodically readout the strength of the probing data from the probing memory block PB, and compare the strength readout to the plurality of predetermined strengths accessed from a table 1080 stored in the register 108. The table 1080 records relationships between the plurality of the predetermined strengths and a plurality of predetermined aging conditions, and thus the controller 106 may be aware of to what extent the memory array 200 has aged by comparing the strength of the probing data with the plurality of predetermined strengths, and each of the first to third memory blocks MB1-MB3 may be enabled or disabled based on a comparison result of the strength of the probing data with the predetermined strengths.

Figure 2B:
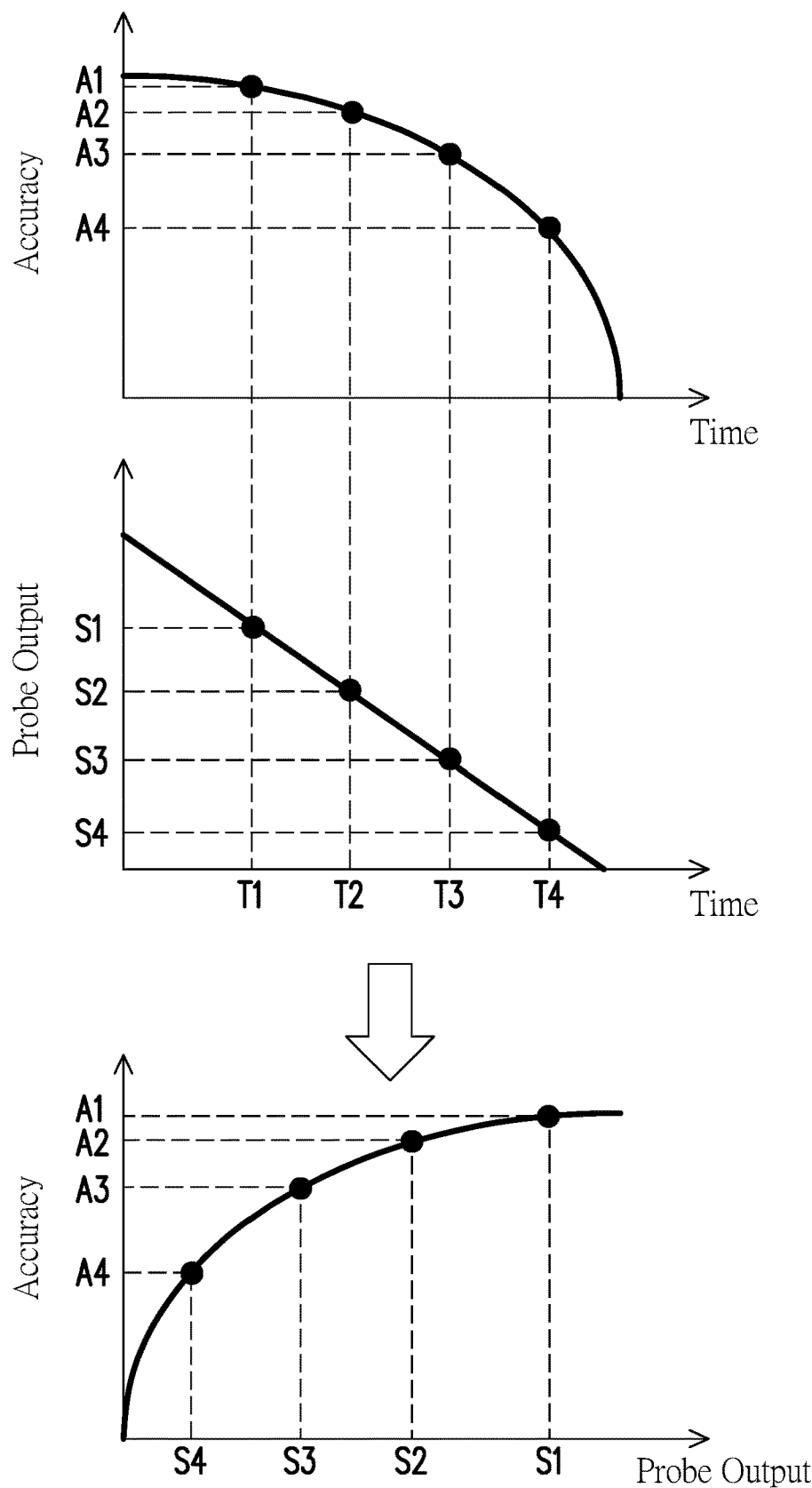
FIG. 2B illustrates a relationship between a probe output and computation accuracy in accordance with some embodiments of the present disclosure.

FIG. 2B illustrates a relationship between a probe output and computation accuracy in accordance with some embodiments of the present disclosure. In the exemplary embodiment, the probe output corresponds to the strength of probe output readout from the probing memory block as illustrated in FIG. 2A, and the computation accuracy corresponds to the accuracy of computation performed by the first memory block MB1.

As can be seen in upper part of FIG. 2B, the computation accuracies A1-A4 of the first model degrades as the operation time of the memory array 200 monotonically decreases. Meanwhile, as depicted in middle part of FIG. 2B, the first to fourth predetermined strengths S1-S4 of the probing data stored in the probing memory block PB also degrades in time. More particularly, at a time point T1, accuracy of the memory array 200 is degraded to the computation accuracy A1 while the probe output is decreased to the first predetermined strength S1. Likewise, at a time point T2, accuracy of the memory array 200 is degraded to the computation accuracy A2 while the probe output is decreased to the strength S2, and so on. Therefore, the relationships between the computation accuracy of the model with the strength of the probe output may be built as in lower part of FIG. 2B. The strength of the probe output may be utilized as an index on evaluating the computation accuracy of the memory array 200. For example, when it is determined that the strength of the probing data is less than or equal to the first predetermined strength, the controller 106 may be aware of that a first predetermined aging condition of the memory array 200 is met by the memory array 200, at which the computation accuracy of the memory array 200 is to be below the computation accuracy A1. Therefore, the strength of the probing data may be utilized for evaluating to what extent the memory array 200 has aged in order to take corresponding actions to control each of the first to third memory blocks MB1-MB3 to be enabled or disabled.

In operation, when the memory system 2 is just activated for computation and the total operation time or the operating temperature of the memory array 200 is still low, the ADC block 2101 may be firstly to be enabled so the first memory block MB1 is capable of performing computation and generate computation results of the first memory block MB1. The weights of the neurons stored in the first memory block MB1 may build up a first model, so when the first memory block MB1 is enabled, input data would be provided to the first memory block MB1 to function as the first model and generate the computation result. Meanwhile, the detects the strength of the probing input stored in the probing memory block PB to determine whether a first predetermined aging condition is met. When it is determined that the aging condition of the memory array 200 meets the first predetermined aging condition, the controller 106 further enables the ADC block 2102 to generate computation results of the second memory block MB2. In another aspect, when the first predetermined aging condition is met, the first memory block MB1 would be suffered from aging and the weights of the neurons stored in the first memory block MB1 would be drifted. In order to compensate those neurons stored by the first memory block MB1, the controller enables the ADC block 2102 to add the second memory block MB2 into computation, so the neurons with backup weights stored in the second memory block MB2 can be used for compensating the neurons stored in the first memory block MB1. Similarly, when it is determined that a second predetermined aging condition is met, the ADC block 2103 is enabled and the third memory block MB3 is added into computation for compensating the neurons stored in the first and second memory blocks MB1. MB2.

Figure 2C:
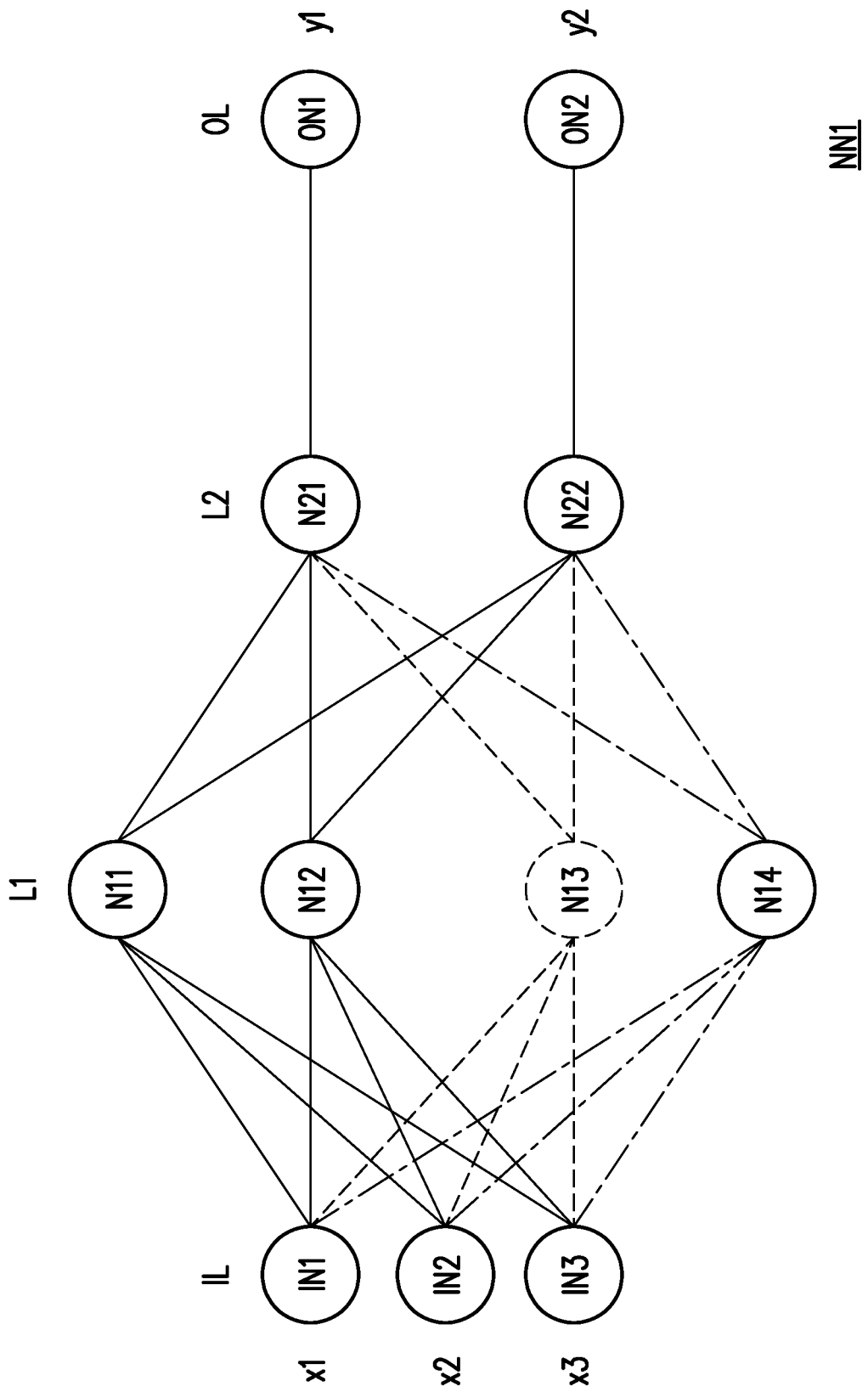
FIG. 2C illustrates a neural network formed by the memory array as illustrated in FIG. 2A in accordance with some embodiments of the present disclosure.

FIG. 2C illustrates a neural network NN1 formed by the memory array 200 as illustrated in FIG. 2A in accordance with some embodiments of the present disclosure. The neural network NN1 is formed by multiple layers, comprising an input layer IL, two computing layers L1, L2 and an output layer OL. The input layer IL receives an input dataset, comprising data x1-x3. These data x1-x3 may be features retrieved from certain inputs, and the neural network NN1 may make analysis on the dataset, to generate outputs y1, y2 through the output layer OL.

In such embodiment, the neural network has two computing layers L1, L2. The computing layer L1 comprises neurons N11-N14, and the computing layer L2 comprises neurons N21, N22. The neurons N11, N2 in the computing layer L1 correspond to the first memory block MB1, the neuron N13 corresponds to the second memory block MB2, and the neuron N14 corresponds to the MB3. In another words, the neurons N11, N12, N21, N22 are activated and the neurons N13, N14 are deactivated in the beginning of performing the CiM operation. As the memory array 200 continues to calculate the computation results, the memory gradually ages and the data stored starts to be varied. When it is determined that the first predetermined aging condition is met, the neuron N13 may be activated by enabling the second memory block MB2 and the ADC block 2102, so the neural network NN1 may perform the CiM operation with the neurons N11, N12, N21, N22 and the backup neuron N13. The added backup neuron N13 may compensate the neurons with drifted weights stored in the first memory block MB1, and thus improving accuracy degradation resulted from memory aging. Similarly, when it is determined that the second predetermined aging condition is met, the neuron N14 may be activated by enabling the third memory block MB3 and the ADC block 2103, so the neural network NN1 may perform the CiM operation with the neurons N11, N12, N13, N21, N22 and the backup neuron N14.

It is noted that the backup neuron is added to any arbitrary layer rather than the last layer of the neural network NN1. More particularly, adding the backup neuron to the last layer will lead to additional output, resulting in different output dimensions and format of the output to be changed. Therefore, the backup neuron is required not to be added in the last computing layer. In such embodiment, the backup neurons N13. N14 are added to the computing layer L1, but the computing layer L2.

In some embodiments, persons skilled in the art may make modifications or alternations to the memory system 2 and the corresponding neural network NN1 based on different design concepts and system requirements. For example, the amount of computing layers in the neural network may be adjusted as long as there are at least two computing layers. In addition, the backup neurons correspond to different predetermined aging conditions may be added to different computing layers.

Therefore, in the last computing layer L2, additional computing paths are added the neurons N21, N22, so the neurons N13, N14 are capable of compensating computations of the drifted neurons N11, N12 having the drifted weights according to the added computing paths. For example, when the backup neuron N13 is added into computation, the computation result of the backup neuron N13 is provided to the neuron N21 to compensate the computation results of the neurons N11. N12. Similarly, when the backup neuron N14 is added into computation, the computation result of the backup neuron N14 is provided to the neuron N21 to compensate the computation results of the neurons N11-N13.

FIG. 3 illustrates a mathematical representation of the CiM operation performed by the neural network NN1 as illustrated in FIG. 2C under different predetermined aging conditions in accordance with some embodiments of the present disclosure. In such exemplary embodiment, the CiM operation performed by the neural network NN1 in FIG. 2C through the memory system 2 in FIG. 2A are represented in mathematical format. Specifically, the controller 106 may, for example but not limited to, record an operating time of the memory array 200 as the aging condition. Hence, the mathematical representations of the CiM operation under different time points TO-T3 are illustrated in FIG. 3.

At the time point TO, when weights of the neurons have just been written to the memory array 200, and the operating time of the memory array 200 is determined to be less than a first predetermined time length, the weights stored in the memory array 200 are deemed to be accurate. Thus, only the first memory block MB1 is enabled and the CiM operation performed by the memory system 2 may be equivalent to the matrix multiplication as follows.

$$X \cdot H \cdot I = Y$$

The input matrix X represents input dataset, and comprises inputs x1-x3. The weight matrixes H and I represent the computation performed by the memory array 200, and each comprising weights h11-h32 and i11-i22 stored in the first memory block MB1. The output matrix Y represents output dataset, and comprises outputs y1-y2. In some embodiments, the memory system 2 is capable of receiving the input matrix X to perform computation to generate probability as the outputs y1, y2 according to the weight matrixes H, I.

At the time point T1, after the memory system 2 has been operated for a while and when it is determined that the operating time of the memory array 200 is greater than the first predetermined time length, the weights stored in the first memory block MB1 started to be drifted and accuracy of the computation degrades. Thus, the second memory block MB2 is enabled to compensate the weights stored in the first memory block MB1, and the CiM operation performed by the memory system 2 may be equivalent to the matrix multiplication as follows.

$$X \cdot H' \cdot I' = Y$$

The weight matrixes H', I' represent the weight matrixes H, I to be drifted after the first predetermined time length. The weight matrixes H', I' each comprising weights h11'-h32' and i11'-i22' drifted from the weights h11-h32 and i11-i22. In such embodiment, after the memory array 200 is operated for the first predetermined time length, the second memory block MB2 is enabled and the backup neuron N13 is added into computation. Therefore, an additional column comprising h13-h33 is added in the weight matrix H', and an additional row comprising i31, i32 is added in the weight matrix I'.

At the time point T2, when it is determined that the operating time of the memory array 200 is greater than a second predetermined time length, the weights stored in the first and second memory blocks MB1, MB2 degrades as the time operating time of the memory array 200 increases. The third memory block MB3 is enabled to compensate the weights stored in the first and second memory blocks MB1, MB2 and the CiM operation performed by the memory system 2 may be equivalent to the matrix multiplication as follows.

$$X \cdot H'' \cdot I'' = Y$$

The weight matrixes H", I" represent the weight matrixes H, I to be drifted after the second predetermined time length. The weight matrix H" comprises weights h11"-h32" and h13'-h33', and the weight matrix I" comprises the weights i11"-i22" and i31'-i32'. In such embodiment, after the memory array 200 is operated for the second predetermined time length, the third memory block MB3 is enabled and the backup neuron N14 is added into computation. Therefore, an additional column comprising h14-h34 is added in the weight matrix H", and an additional row comprising i41, i42 is added in the weight matrix I".

Figure 4A:
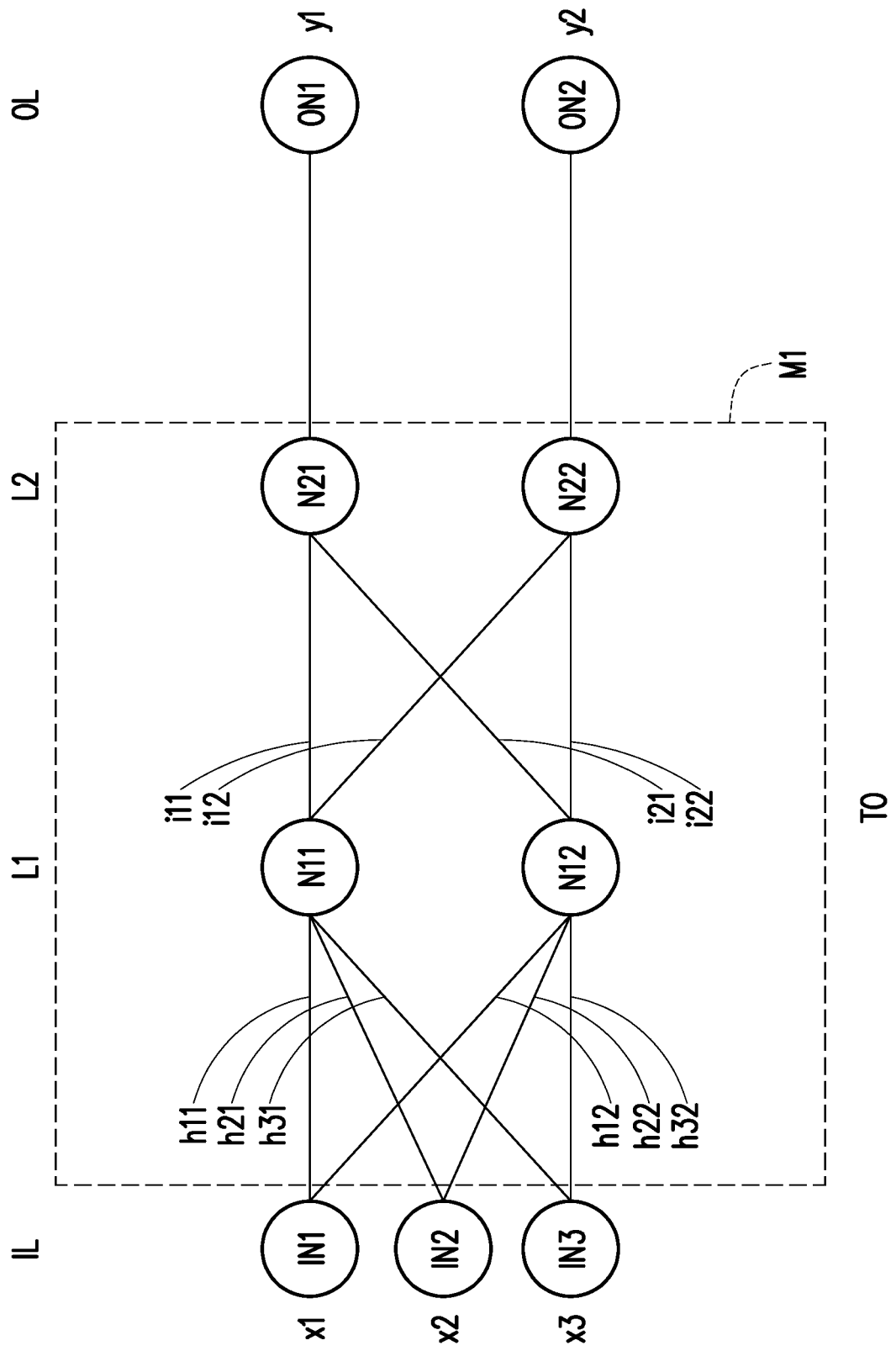
FIGS. 4A-4C illustrate how the CiM operation as illustrated in FIG. 3 is performed under different aging conditions in accordance with some embodiments of the present disclosure.
Figure 4B:
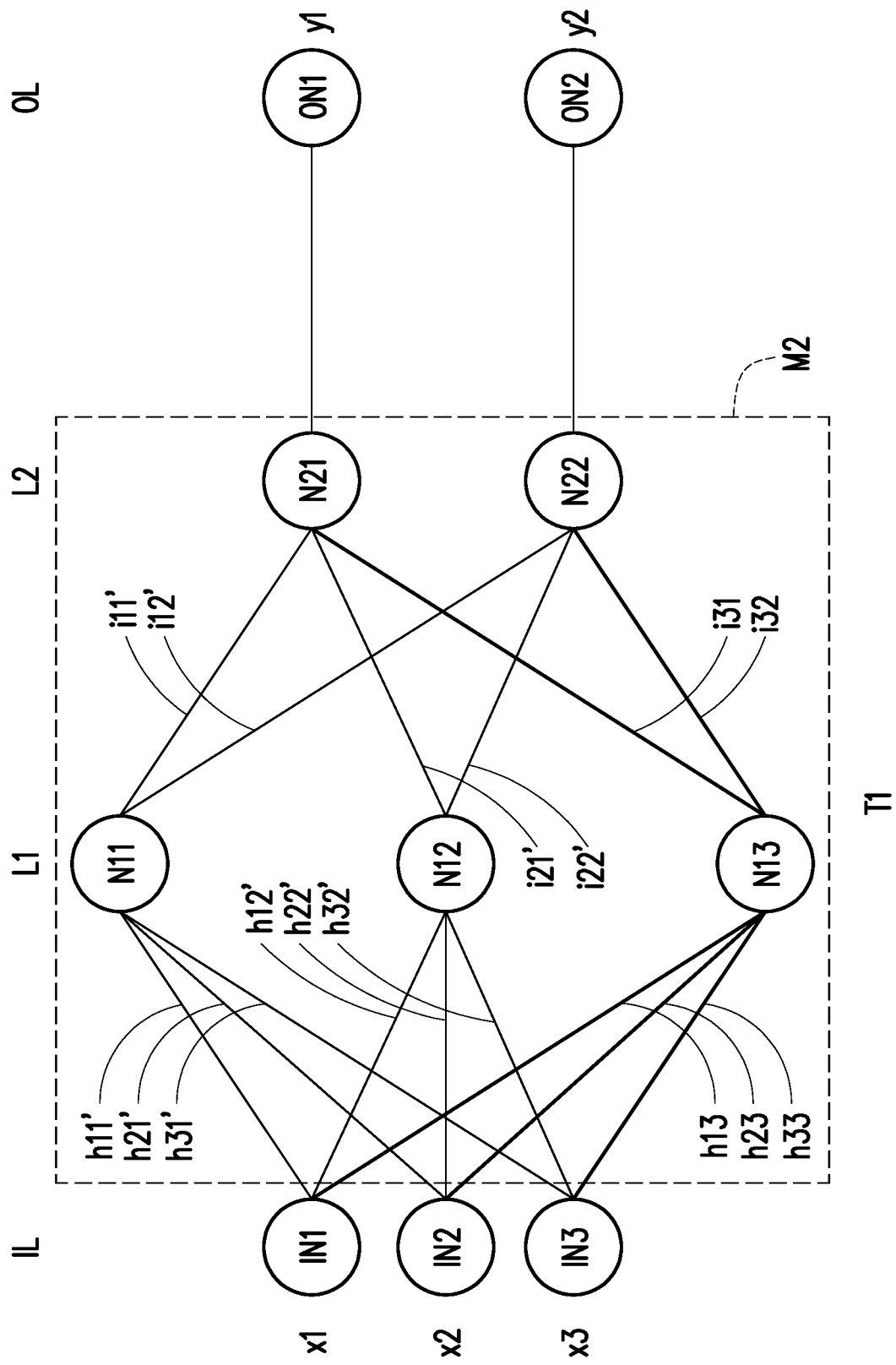
Figure 4C:
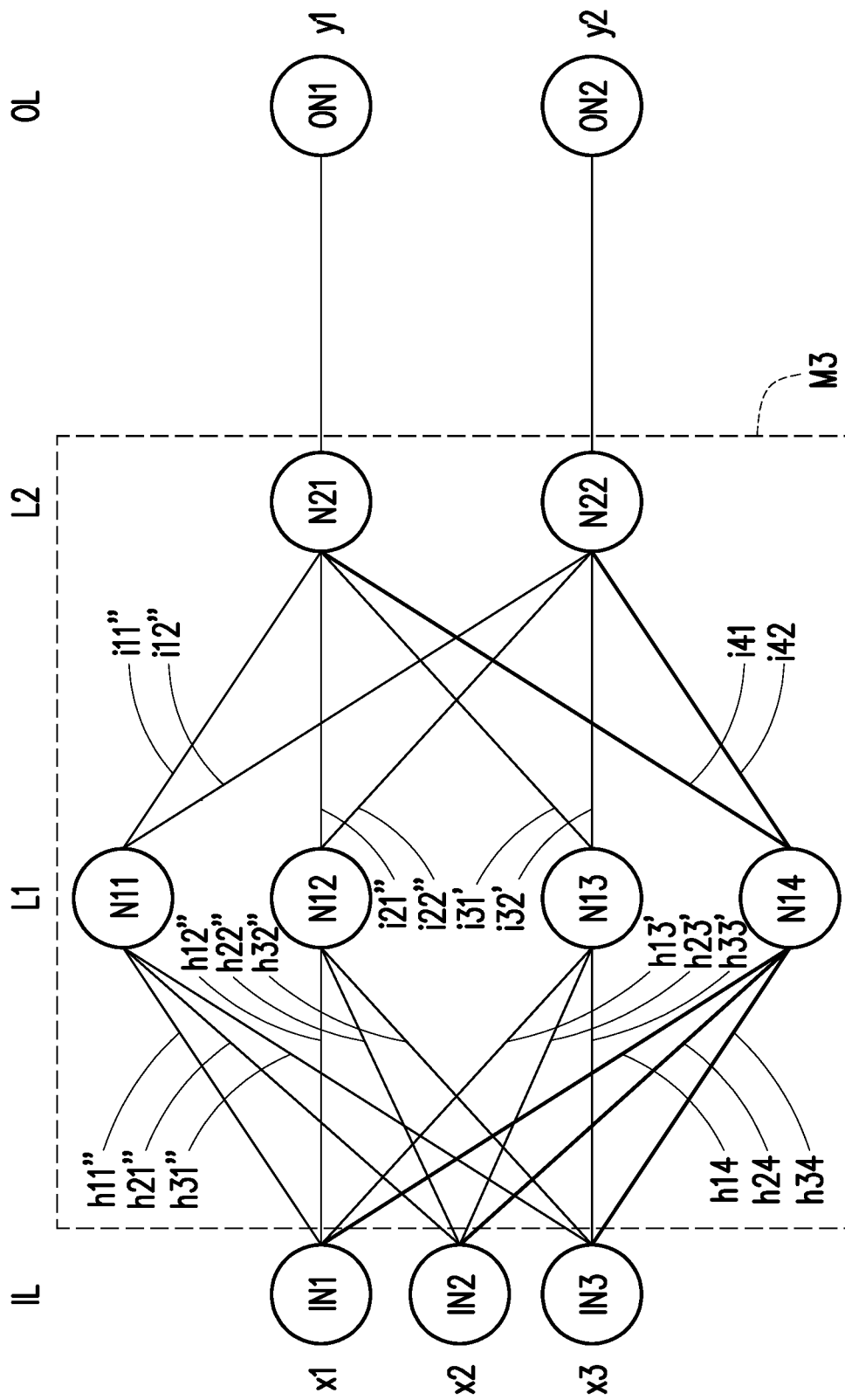

FIGS. 4A-4C illustrate how the CiM operation as illustrated in FIG. 3 is performed under different aging conditions in accordance with some embodiments of the present disclosure. Please refer to FIGS. 2A, 3, 4A-4C to better understand the description of the CiM operation below.

In FIG. 4A, the memory array 200 is operated under the time point TO, and it is determined that the operating time of the memory array 200 is less than the first predetermined time length. In such embodiment, the first memory block MB1 is enabled, and the neurons N11, N12 stored by the first memory block MB1 are activated for computation. Hence, a first model M1 is formed by the neurons N11. N12, N21. N22 in the neural network NN1. Each neuron calculates a sum of product according to the values provided by a previous layer and the weights connected there between. For example, the neuron N11 calculates the sum of products of the inputs x1-x3 respectively times the weights h11-h31, the neuron N12 calculates the sum of products of the inputs x1-x3 respectively times the weights h12-h32, and so on. Therefore, the outputs y1-y2 can be generated by inputting the inputs x1-x3 to the first model M1.

In FIG. 4B, at the time point T11 when it is determined that the operating time of the memory array 200 is greater than or equal to the first predetermined time length and less than the second predetermined time length, the second memory block MB2 is enabled and the neuron N13 stored by the second memory block MB2 is activated for computation. Hence, a second model M2 is formed, wherein the model M2 comprises the neurons N11, N12, N21, N22 comprised by the first model M1, and an additional backup neuron N13. It is noted that the weights h11-h32, i11-i22 corresponding to the neurons N11, N12. N21. N22 have been changed to the weights h11'-h32', i11'-i22' due to increase of the operating time. In order to compensate those neurons N11. N12, N21, N22 with the drifted weights, the backup neuron N13 is added to the computing layer L1. As a result, the second model M2 may be used for approximating the first model M1 to perform the CiM operation.

In FIG. 4C, at the time point T2 when it is determined that the operating time of the memory array 200 is greater than or equal to the second predetermined time length, the third memory block MB3 is enabled and the neuron N14 stored by the third memory block MB3 is activated for computation. As such, a third model M3 is formed, wherein the third model M3 comprises the neurons N11, N12, N13, N21, N22 as comprised by the second model M2, and an additional backup neuron N14. The weights h11'-h32', i11'-i22' corresponding to the neurons N11, N12, N21, N22 have been changed into the weights h11"-h32", i11"-i22" and the weights h13-h33, i31-i32 corresponding to the neuron N13 have been changed into the weights h13'-h33', i31'-i32' due to increase of the operating time. Similarly, the third model M3 may use the backup neuron N14 with the backup weights h14-h34, i41-i42 for compensating drifting of the neurons N11, N12, N13, N21, N22.

Figure 5A:
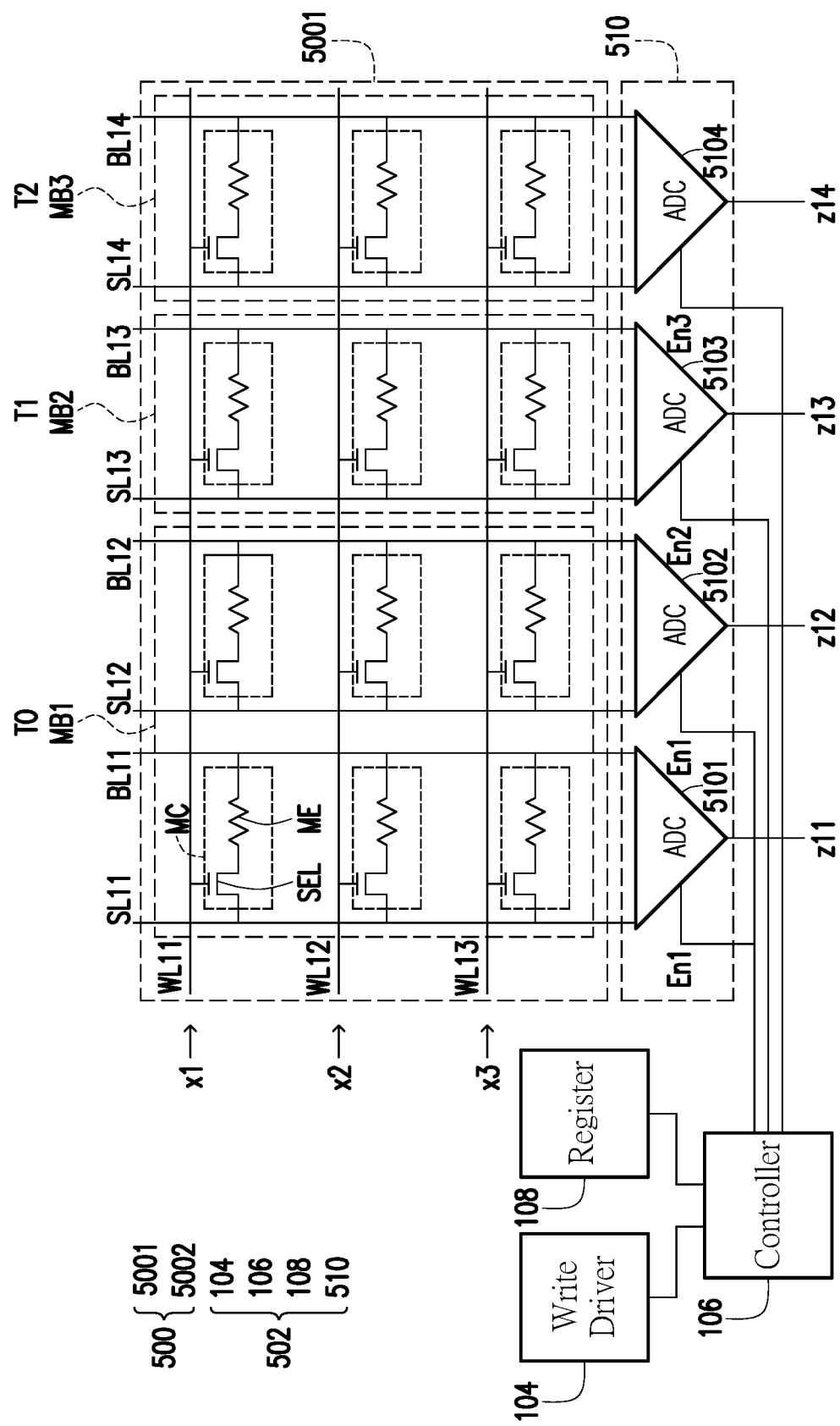
FIGS. 5A-5B illustrate a circuit diagram of the memory system in accordance with some embodiments of the present disclosure.
Figure 5B:
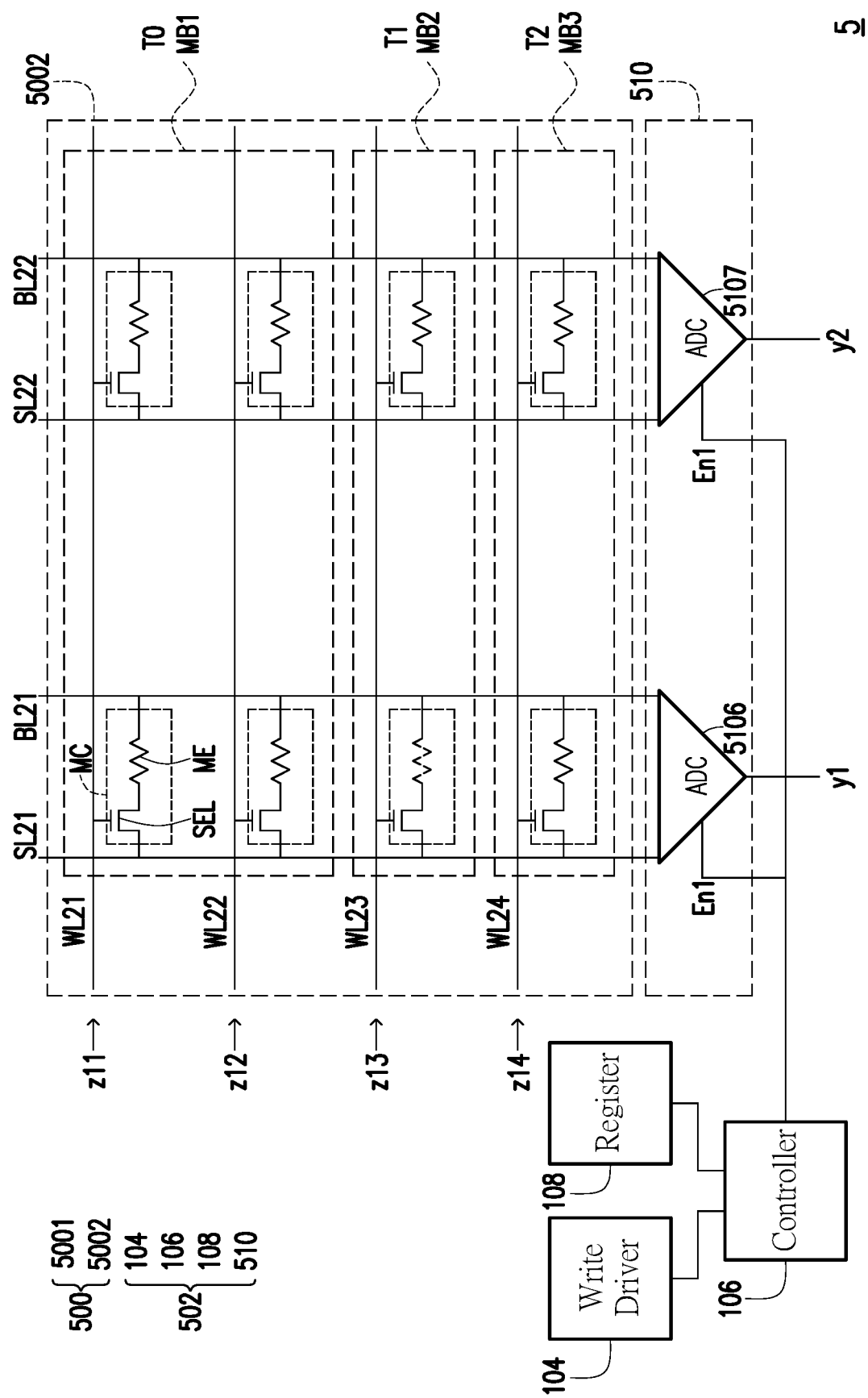

FIGS. 5A-5B illustrate a circuit diagram of the memory system 5 in accordance with some embodiments of the present disclosure. The memory system 5 may be utilized for implementing the CiM operation as illustrated in FIGS. 3, 4A-4C. The memory system 5 comprises a memory array 500 and a control circuit 502. The memory array 500 is divided into a first layer circuit 5001 and a second layer circuit 5002. The control circuit 502 comprises a write driver 104, a controller 106, a register 108 and an ADC 510.

In FIG. 5A, the first layer circuit 5001 of the memory array 500 is illustrated along with the connections with the ADCs and the controller 106. The first layer circuit 5001 of the memory array 500 comprises multiple memory cells MC, bit lines BL11-BL14, source lines SL11-SL14 and word lines WL11-WL13. Each memory cell MC comprises an access transistor SEL and a memory element ME. Each memory cell MC is coupled between a corresponding source line and a corresponding bit line and being controlled by a corresponding word line. It is noted that some circuit (e.g. the probing memory block PB) are omitted in FIG. 5A.

In operation, the first layer circuit 5001 corresponds to the computing layer L1 as illustrated in FIGS. 4A-4C. Each column in the first layer circuit 5001 corresponds to a neuron in FIGS. 4A-4C, and each row in the first layer circuit 5001 corresponds to inputs received. Specifically, the multiple memory cells MC in a same column store weights of a neuron corresponding to the bit line and respectively receives the inputs x1-x3 for performing the CiM operation. For example, the bit line BL1 corresponds to the neuron N11 as illustrated in FIG. 4A, and the weights h11-h13 are respectively stored by the memory elements ME of the memory cells MC connected to the bit line BL11. Further, the memory cells MC respectively receives the inputs x1-x3 through the word lines WL11-WL13, and each memory cell MC drains a corresponding current from the source line SL11 based on the input received and the weight stored. The level of the current drained represents a multiplication operation between the input value and the weight value, and the total current generated by the memory cells MC are summed up on the bit line BL11. Hence, the total current flowing through the bit line BL11 represents result of the sum of product operation calculated by the neuron N11. At last, the summed-up current of the bit line BL11 is provided to the sense amplifier (not illustrated in FIG. 5A) and the ADC to generate a computation result z11 of the neuron N11. Similarly, a computation result z12 is also generated on the bit line BL12 corresponding to the neuron N12.

Moreover, at the time point T0 when it is determined that the operating time of the memory array 500 is less than the first predetermined time length, an enable signal En1 with an enabled voltage level (e.g. a high level voltage) is provided from the controller 106 to the ADCs 5101, 5102, and enable signals En2, En3 with a disable voltage level (e.g. a low level voltage) is provided from the controller 106 to the ADCs 5103, 5104. Therefore, a first memory block MB1 in the first layer circuit 5001 may be enabled to generate the computation results z11, z12.

Then, at the time point T1 when it is determined that the operating time of the memory array 500 is greater than or equal to the first predetermined time length and less than the second predetermined time length, the enable signals En1, En2 with the enable voltage level (e.g. a high level voltage) are provided from the controller 106 to the ADCs 5101-5103, and the enable signal En3 with the disable voltage level (e.g. a low level voltage) is provided from the controller 106 to the ADC 5104. Therefore, the second memory block MB2 may be added into computation, and the first memory block MB1 and the second memory block MB2 in the first layer circuit 5001 may be enabled to generate the computation results z11, z12, z13.

Similarly, at the time point T2 when it is determined that the operating time of the memory array is greater than the second predetermined time length, all enable signals En1-En3 are controlled to be at the enable voltage level (e.g. a high-level voltage). The first to third memory blocks MB1-MB3 are enabled and computation results z11-z14 are generated.

In FIG. 5B, the second layer circuit 5002 of the memory array 500 corresponds to the computing layer L2 as illustrated in FIGS. 4A-4C. Therefore, two columns respectively corresponding to the neurons N21. N22 and four rows corresponding to the four computation results received by the computing layer L2 are illustrated in FIG. 5B. It is noted that some circuit (e.g. the probing memory block PB) are omitted in FIG. 5B.

At the time point T0, only the computation results z11, z12 are provided to the second layer circuit 5002 and the first memory block MB1 in the second layer circuit 5002 is activated and the second and third memory blocks MB2. MB3 are disabled. For example, the computation results z13, z14 may be controlled at a disable voltage level, so the memory cells MC on the third and fourth rows are not activated for computation. Therefore, the second layer circuit 5002 generates the outputs y1, y2 based on the computations results z11, z12 and the weights i11-i22 stored in the first and second rows.

At the time point T1, the computation results z11-z13 are provided to the second layer circuit 5002, and thus the first memory block MB1 and the second memory block MB2 are activated for computation. The memory cells MC on the third row may be activated for the second layer circuit 5002 to generate the compensated outputs y1, y2.

Similarly, at the time point T2, the computations results z11-z14 are provided to the second layer circuit 5002, and the third memory block MB3 is activated for the second layer circuit 5002 to generate the compensated outputs y1, y2.

Figure 6:
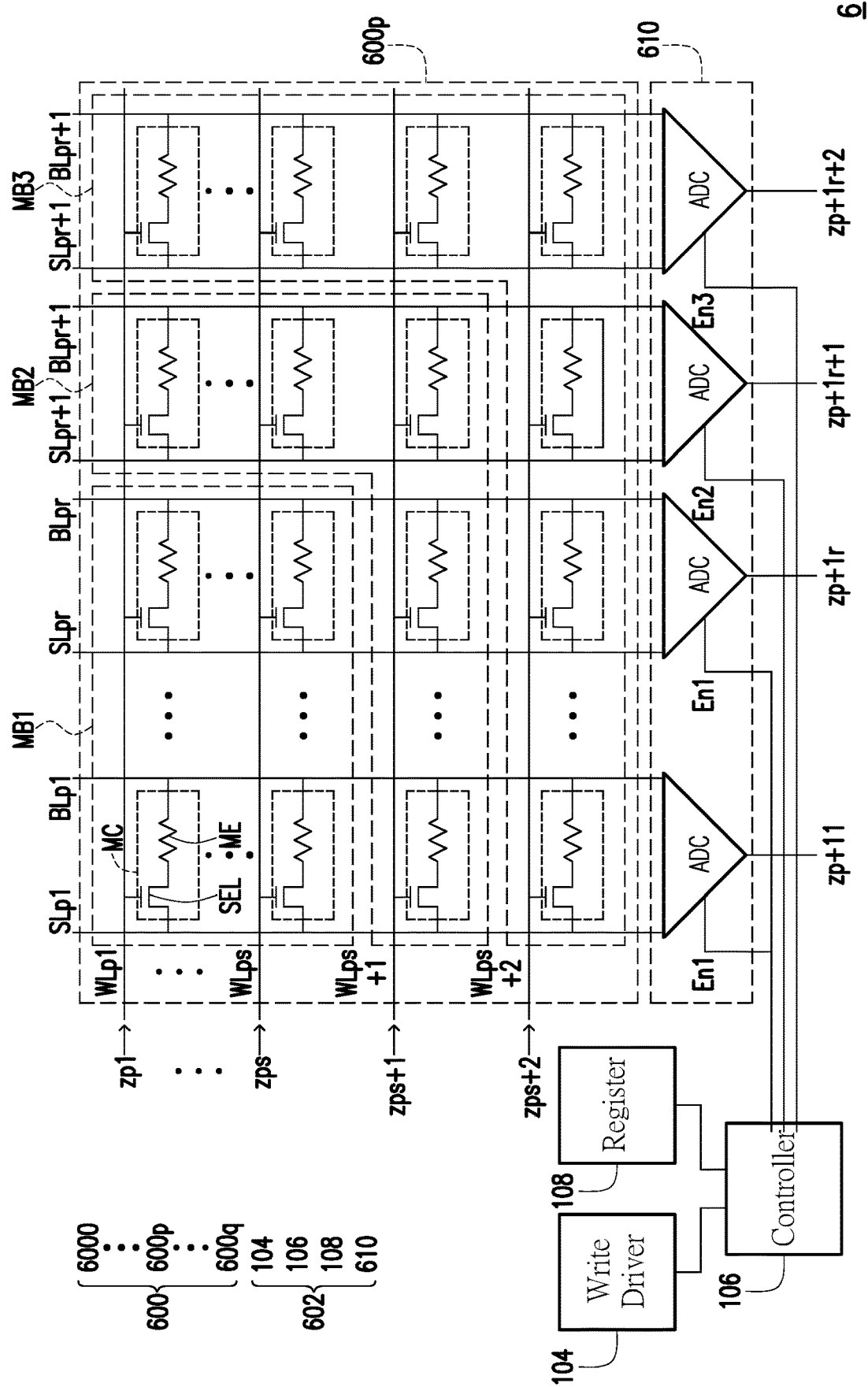
FIG. 6 illustrates a partial schematic diagram of a memory system in accordance with some embodiments of the present disclosure.

FIG. 6 illustrates a partial schematic diagram of a memory system 6 in accordance with some embodiments of the present disclosure. The memory system 6 in FIG. 6 is similar to the memory system 5 in FIGS. 5A, 5B, except that some circuits (e.g. the probing memory block PB, the write driver 104 and the register 108) are omitted for simplicity, and only a pth layer circuit 600p is illustrated in FIG. 6. Specifically, the memory system 6 comprises a memory array 600 and a control circuit 602. The memory array 600 comprises multiple layer circuits 6000-600$q$, and a pth layer circuit 600$p$ is illustrated in FIG. 6.

In such embodiment, at the time point T0, the first memory block MB1 is enabled for computation, and r columns of the pth layer circuit 600$p$ is enabled by the controller 106 for computation. In addition, computation results zp1-zps are provided from the p-1th layer circuit (not illustrated in FIG. 6). That is, p neurons in the pth computing layer is utilized for performing the CiM operation at the time point T0.

Then, at the time point T1, r+1th column of the pth layer circuit 600$p$ is enabled by the controller 106 for computation, representing a neuron is added in the pth layer. Further, the number of the computation results zp1-zps+1 provided from p-1th layer circuit is increased by one, representing a neuron is added in the p-1th layer, and thus a s+1th row of the pth layer circuit 600$p$ is correspondingly activated. Therefore, at the time point T1, the r+1th column and the s+1th row are activated.

Similarly, at the time point T2, the r+2th column and the s+2th row are activated, representing a neuron is added in both of the p-1th and pth layers.

Persons skilled in the art may make modifications and alternations to the aforementioned embodiments based on different design concepts and system requirements. For example, there can be more than one neuron to be added at the time point T1. Adding more than one neuron (e.g. 16 or 32 neurons) in the pth layer represents activating equivalent number of columns in the pth layer circuit. In addition, the added columns in the pth layer circuit will resulted in increased amount of the computation results generated by the pth layer circuit to be increased. Consequently, equivalent number of rows in the p+1th layer circuit are correspondingly activated.

In other examples, other indexes capable of estimating to what extent the memory array 100 has aged due to usage or environment may be used. For example, when the operating temperature is used as the aging condition, the memory system 6 in FIG. 6 may activate the first memory block MB1 at the time point T0 when it is determined that the operating temperature is less than a first predetermined temperature. At the time point T1 when it is determined that the operating temperature is greater than or equal to the first predetermined temperature and less than a second predetermined temperature, the first and second memory blocks MB1, MB2 may be both activated for computation. At the time point T2 when it is determined that the operating temperature is greater than or equal to the second predetermined temperature, the first to third memory blocks MB1-MB3 may be all activated for computation.

Unlike the operating time, change of the operating temperature is reversible. In some circumstances, the operating temperature may go from over the second predetermined temperature to be under the first predetermined temperature. As such, the controller 106 of the memory system 6 may correspondingly disabling the second and third memory blocks MB2, MB3 since the weights stored in the first memory block MB1 are recovered to correct values as the operating temperature drops to be below the first predetermined temperature. Therefore, the memory system 6 is capable of adapting changes of the aging condition to generate correct outputs.

Although the probing memory block is not illustrated in FIGS. 5A, 5B, 6, it is noted that the probing memory block PB is comprised by the memory array 500/600 with similar a structure to the first memory block MB1. In some embodiments, the probing memory block PB may comprise at least one column and the same amount of rows as the first memory block MB1 does. The strength of the probing data stored in the probing memory block PB may be readout by the controller 106 through the ADC block 2100 (not illustrated in FIG. 5A) to evaluate the aging condition of the memory array 500/600.

FIG. 7A illustrates a flowchart of an operating method in accordance with some embodiments of the present disclosure. The operating method may be implemented by the memory systems 1, 2, 5, 6 as illustrated in FIGS. 1, 2A, 5A, 5B, 6. The operating method comprises steps S71-S73.

In step S71, a probing data is written to a probing memory block PB of a memory array 100/200/500/600 of the memory system 1/2/5/6. Specifically, the controller 106 may access the register 108 to retrieve related configuration data of the probing data, and control the write driver 104 to perform the write operation to the probing memory block PB. Meanwhile, weights of the neurons are also programmed to the first to third memory blocks MB1-MB3, so the probing memory block PB and the first to third memory blocks MB1-MB3 are programmed simultaneously or within a same time region, and declination on the probing data in the probing memory block PB and the weights in the first to third memory blocks MB1-MB3 may be similar or identical.

In step S72, a strength of the probing data is detected from the probing memory block PB to obtain an aging condition of the memory array 100/200/500/600. Since declination on the probing data in the probing memory block PB and the weights in the first to third memory blocks MB1-MB3 may be similar or identical, the strength of the probing data may be utilized on evaluating the degradation of the weights stored in the first to third memory blocks MB1-MB3.

Specifically, the controller 106 may access the table 108 stored in the register 108 which records relationships between a plurality of predetermined strengths and predetermined aging conditions. The controller 106 may compare the detected strength of the probing data to the plurality of the predetermined strengths to determine whether the predetermined aging conditions are met. For example, the controller 106 may compare the detected strength of the probing data with the first predetermined strength, and determines the first predetermined aging condition to be met when the strength of the probing data is less than or equal to the first predetermined strength. Similarly, the second aging condition be met when the strength of the probing data is less than or equal to the second predetermined strength.

In step S73, each memory block is controlled to be enabled or disabled according to the aging condition. Specifically, based on the strength of the probing data, the controller 106 may obtain the aging condition of the memory array 100/200/500/600. The controller 106 may activates corresponding memory blocks and use the neurons stored therein for aging compensation when a certain aging condition is met.

Since controller 106 detects the strength of the probing memory block to evaluate degradation of the memory array 100/200/500/600, the controller 106 is capable of evaluating multiple factors (e.g. the operating time, the operating temperature, the accessed count, etc.) at once, which significantly reduces design complexity of the memory system 1/2/5/6.

Figure 7:
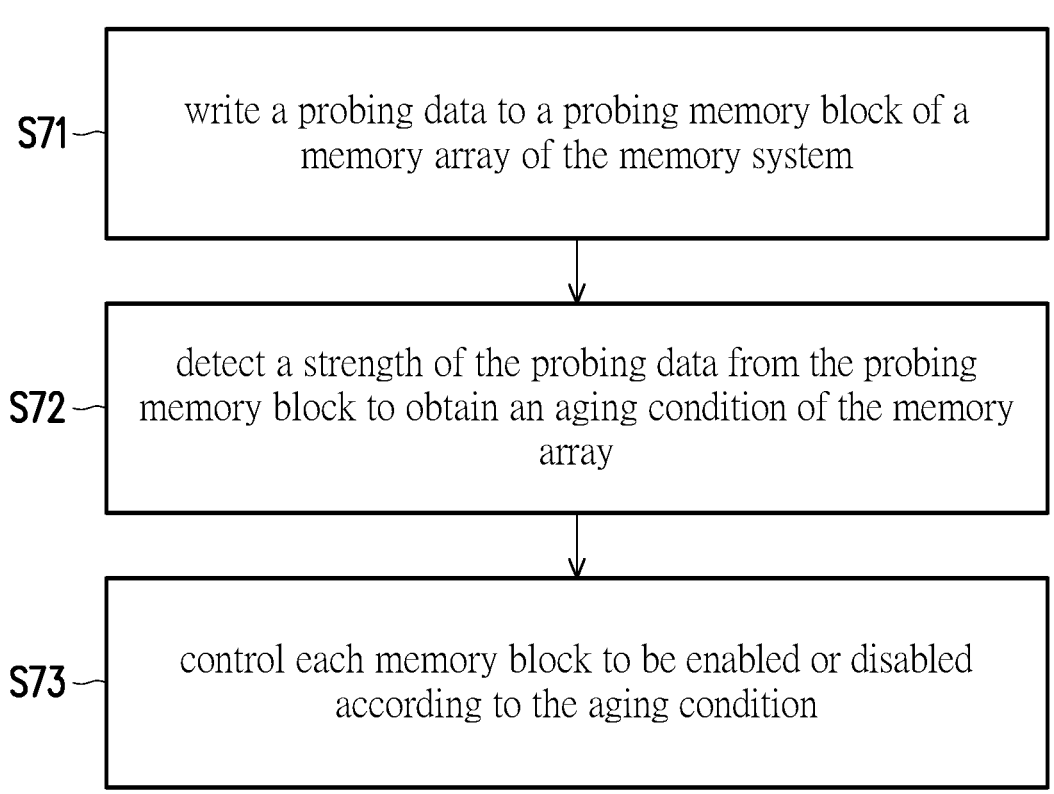
FIG. 7 illustrates a flowchart of an operating method in accordance with some embodiments of the present disclosure.
Figure 8:
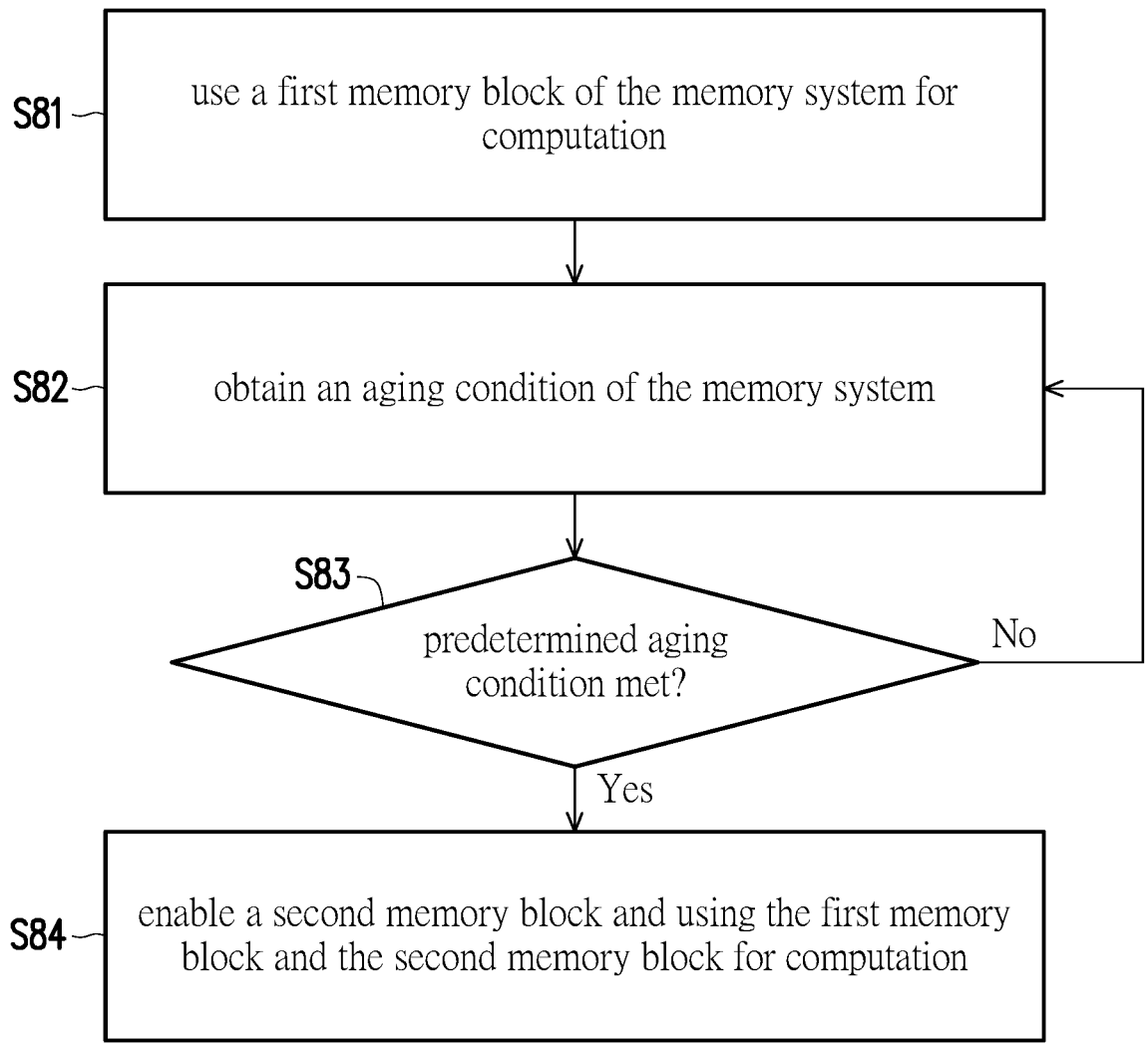
FIG. 8 illustrates a flowchart of an operating method in accordance with some embodiments of the present disclosure.

FIG. 8 illustrates a flowchart of an operating method in accordance with some embodiments of the present disclosure. The operating method may be implemented by the memory systems 1, 2, 5, 6 as illustrated in FIGS. 1, 2A, 5A, 5B, 6. The operating method comprises steps S81-S84. In some embodiments, the steps S81-S84 is the detailed operations of the step S73 as illustrated in FIG. 7.

In step S81, a first memory block MB1 of the memory system 1/2/5/6 is used for computation. Specifically, the first memory block MB1 stores weights of neurons of a first model, so the memory array 100/200/500/600 may perform the CiM operation as the first model.

In step S82, an aging condition is obtained by the controller 106 of the memory system 2/5/6. The aging condition may carry information that related to factors which affecting data stored in the memory array 100/200/500/600 to be varied. The aging condition may be utilized by the controller 106 to evaluate to what extent the data stored in the memory array 100/200/500/600 has drifted. For example, the aging condition may comprise at least one of an operating time, an operating temperature, or the like.

In step S83, the aging condition has been monitored to see whether the aging condition meets the predetermined aging condition. Corresponding to the aging condition, the predetermined aging condition may comprise at least one of a predetermined operating time length, a predetermined temperature or the like. The controller 106 may compare the aging condition with the predetermined aging condition to see whether the memory array 100/200/500/600 has drifted.

In some embodiments, the predetermined aging condition may be stored in the register 108, and the predetermined aging condition corresponds to when an accuracy degradation of the memory array 100/200/500/600 is greater than or equal to a predetermined degradation threshold (e.g. 3%) due to data drift caused by aging. That is, when it is determined that the aging condition meets the predetermined aging condition, the accuracy of the CiM operation performed by the memory array 100/200/500/600 has a drop greater than or equal to the predetermined degradation threshold (e.g. 3%). In some embodiments, the predetermined aging condition may comprise multiple predetermined aging time lengths and/or predetermined temperatures, the predetermined aging condition may be stored by the register 106 as a lookup table. When it is determined that the aging condition meets the predetermined aging condition, the operating method enters the step S84. Otherwise, when it is determined that the aging condition does not meet the predetermined aging condition, the operating method enters the step S82.

In step S84, when it is determined that the aging condition meets the predetermined aging condition, the controller 106 enables a second memory block MB2 to add at least one backup neuron into computation. In some embodiments, the second memory block MB2 stores weights of backup neurons to be added into computation. After the second memory block MB2 is enabled, the backup neurons stored by the second memory block MB2 may be utilized for compensating the neurons stored by the first memory block MB1, and an accuracy of the CiM operation performed by the memory array 100/200/500/600 with the first and second memory blocks MB1, MB2 enabled may have an accuracy degradation less than the predetermined degradation threshold.

Figure 9:
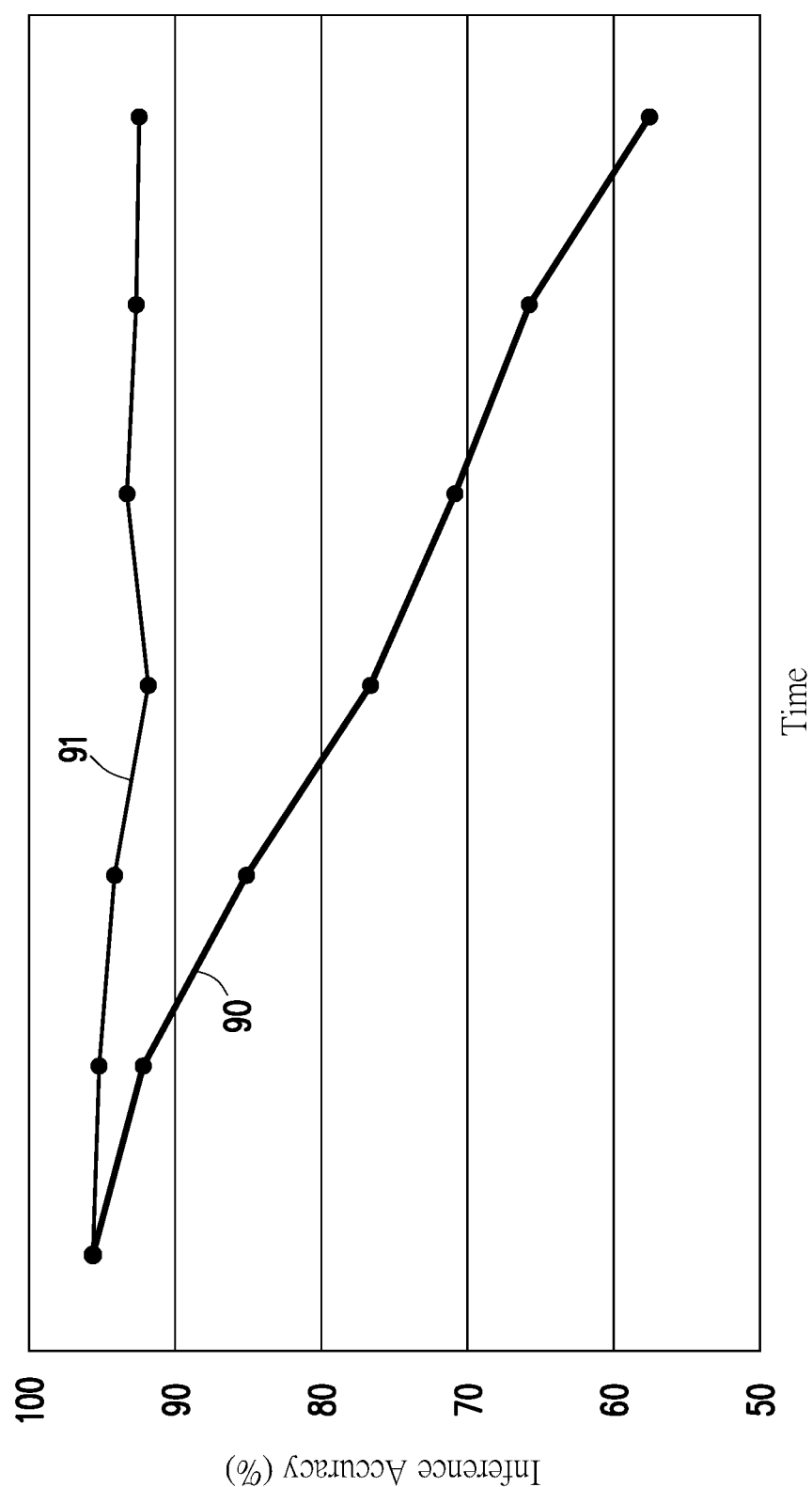
FIG. 9 illustrates a relationship curve between accuracy and time of memory systems in accordance with some embodiments of the present disclosure.

FIG. 9 illustrates a relationship curve between accuracy and time of memory systems in accordance with some embodiments of the present disclosure. Two curves 90, 91 are illustrated in FIG. 9 which respectively illustrates accuracy of the CiM operations performed by corresponding memory systems under different operating time. Specifically, the curve 90 corresponds to the accuracy relationship of a memory system without adding backup neuron, and the curve 91 corresponds to the accuracy relationship of another memory system with adding backup neuron.

As can be seen in the curve 90, the accuracy of the CiM performed by the memory system without adding backup neuron decays as the operating time increases. In comparison, the curve 91 is maintained at high accuracy level, and thus demonstrating that the memory system with adding the backup neuron may effectively compensate effects brought by aging and keep the CiM operation to be accurate.

In accordance with an embodiment, a memory system comprises a memory array. The memory array comprises a probing memory block and a plurality of memory blocks; and, a controller, coupled to the memory array, wherein the controller is configured to: write a probing data to the probing memory block; detect a strength of the probing data from the probing memory block to obtain an aging condition of the memory array; and control each memory block to be enabled or disabled according to the aging condition.

In accordance with an embodiment, an operating method of a memory system comprises: writing a probing data to a probing memory block of a memory array of the memory system; detecting a strength of the probing data from the probing memory block to obtain an aging condition of the memory array; and, controlling each memory block to be enabled or disabled according to the aging condition.

In accordance with an embodiment, a controller adapted control a memory array comprising a probing memory block and a plurality of memory blocks, the controller is configured to perform; write a probing data to the probing memory block; detect a strength of the probing data from the probing memory block to obtain an aging condition of the memory array; and, control each memory block to be enabled or disabled according to the aging condition.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A memory system, comprising:
  a memory array, comprising:
    a probing memory block and a plurality of memory blocks, wherein the probing memory block is programmed to store data and the plurality of memory blocks are programmed to store weights of neurons in a neural network; and
  a control circuit, coupled to the memory array, wherein the control circuit is configured to:
    write a probing data to the probing memory block;
    detect a strength of the probing data from the probing memory block to obtain an aging condition of the memory array; and
    control each memory block to be enabled or disabled according to the aging condition,
  wherein the plurality of memory blocks at least comprises a first memory block and a second memory block, the first memory block is programmed to store original weights of original neurons of a first model, the second memory block is programmed to store predicted weights of at least one backup neuron, the control circuit is further configured to:
use the probing data stored in the probing memory block and the original weights of the original neurons of the first model stored in the first memory block to perform computation of the neural network for obtaining the aging condition of the memory array;
determine whether the aging condition meets a first predetermined aging condition; and
when it is determined that the aging condition meets the first predetermined aging condition, the second memory block is enabled and the at least one backup neuron stored in the second memory block is added to the first model with the original neurons to generate a second model in the neural network for compensating the original neurons of the first model stored in the first memory block by adding the at least one backup neuron to the original neurons of the first model.

2. The memory system of claim 1, wherein a table records a plurality of predetermined strengths respectively corresponding to a plurality of predetermined aging conditions, the control circuit is configured to access the table to compare the strength of the probing data with the plurality of predetermined strengths for determining whether the plurality of predetermined aging conditions are met.

3. The memory system of claim 1, wherein the control circuit is configured to:
compare the strength of the probing data with a first predetermined strength; and
when the strength of the probing data is determined to be less than or equal to the first predetermined strength, enable both of the first memory block and the second memory block for computation.

4. The memory system of claim 3, wherein the plurality of memory blocks further comprises a third memory block, and the control circuit is configured to:
compare the strength of the probing data with a second predetermined strength; and
enable the first memory block, the second memory block and the third memory block for computation when the strength of the probing data is less than or equal to the second predetermined strength, wherein the second predetermined strength is less than the first predetermined strength.

5. The memory system of claim 1, wherein the control circuit determines that the aging condition meets the first predetermined aging condition when an operating time of the memory system is greater than or equal to a first predetermined time length, or an operating temperature of the memory system is greater than or equal to a first predetermined temperature.

6. The memory system of claim 5, wherein when it is determined by the control circuit that the aging condition meets the first predetermined aging condition, the original weights of the original neurons stored in the first memory block are transferred as drifted weights and the predicted weights of the at least one backup neuron is transferred as backup weights of the second model.

7. The memory system of claim 6,
wherein the first memory block having the original neurons with the drifted weights and the second memory block having the at least one backup neuron with the backup weights are used for performing computation as the second model.

8. The memory system of claim 7, wherein the at least one backup neuron is added to at least one arbitrary layer rather than a last layer of the first model to generate the second model.

9. The memory system of claim 1, wherein the control circuit comprising:
a controller;
a write driver for writing the probing data to the probing memory block controlled by the controller; and
at least one analog to digital converter controlled by the controller,
wherein the at least one analog to digital converter (ADC) is coupled to the probing memory block and the plurality of memory blocks for performing the computation of the neural network controlled by the controller.

10. The memory system of claim 9, wherein the at least one ADC comprising:
a probing ADC block coupled to the probing memory block and the controller; and
a plurality of ADC blocks coupled to the plurality of memory blocks, respectively, and the controller is couple to the plurality of ADC blocks.

11. An operating method of a memory system, comprising:
writing a probing data to a probing memory block of a memory array of the memory system, wherein the probing memory block is programmed to store data;
detecting a strength of the probing data from the probing memory block to obtain an aging condition of the memory array;
controlling a plurality of memory blocks to be enabled or disabled according to the aging condition, wherein the plurality of memory blocks are programmed to store weights of neurons in a neural network, the plurality of memory blocks at least comprises a first memory block and a second memory block, the first memory block is programmed to store original weights of original neurons of a first model, and the second memory block is programmed to store predicted weights of at least one backup neuron,
wherein the operating method further comprises:
using the probing data stored in the probing memory block and the original weights of the original neurons of the first model stored in the first memory block to perform computation of the neural network for obtaining the aging condition of the memory array;
determining whether the aging condition meets a first predetermined aging condition; and
when it is determined that the aging condition meets the first predetermined aging condition, the second memory block is enabled and the at least one backup neuron stored in the second memory block is added to the first model with the original neurons to generate a second model in the neural network for compensating the original neurons of the first model stored in the first memory block by adding the at least one backup neuron to the original neurons of the first model.

12. The operating method of claim 11, wherein a plurality of predetermined strengths respectively corresponding to a plurality of predetermined aging conditions is recorded by a table, the operating method comprises:
accessing the table to compare the strength of the probing data with the plurality of predetermined strengths for determining whether the plurality of predetermined aging conditions are met.

13. The operating method of claim 11, comprising:
comparing the strength of the probing data with a first predetermined strength; and
when the strength of the probing data is determined to be less than or equal to the first predetermined strength, enabling both of the first memory block and the second memory block for computation.

14. The operating method of claim 13, wherein the plurality of memory blocks further comprises a third memory block, the operating method comprises:
comparing the strength of the probing data with a second predetermined strength; and
enabling the first memory block, the second memory block and the third memory block for computation when the strength of the probing data is less than or equal to the second predetermined strength, wherein the second predetermined strength is less than the first predetermined strength.

15. The operating method of claim 11, comprising:
determining that the aging condition meets the first predetermined aging condition when an operating time of the memory system is greater than or equal to a first predetermined time length, or an operating temperature of the memory system is greater than or equal to a first predetermined temperature.

16. The operating method of claim 15, wherein when it is determined that the aging condition meets the first predetermined aging condition, the original weights of the original neurons stored in the first memory block are transferred as drifted weights and the predicted weights of the at least one backup neuron is transferred as backup weights of a second model.

17. The operating method of claim 15,
wherein the first memory block having the original neurons with the drifted weights and the second memory block having the at least one backup neuron with the backup weights are used for performing computation as the second model.

18. A control circuit adapted to control a memory array comprising a probing memory block and a plurality of memory blocks, the control circuit is configured to perform:
write a probing data to the probing memory block, wherein the probing memory block is programmed to store data, the plurality of memory blocks are programmed to store weights of neurons in a neural network;
detect a strength of the probing data from the probing memory block to obtain an aging condition of the memory array; and
control each memory block to be enabled or disabled according to the aging condition,
wherein the plurality of memory blocks at least comprises a first memory block and a second memory block, the first memory block is programmed to store original weights of original neurons of a first model, the second memory block is programmed to store predicted weights of at least one backup neuron,
the control circuit is further configured to:
use the probing data stored in the probing memory block and the original weights of the original neurons of the first model stored in the first memory block to perform computation of the neural network for obtaining the aging condition of the memory array;
determine whether the aging condition meets a first predetermined aging condition; and
when it is determined that the aging condition meets the first predetermined aging condition, the second memory block is enabled and the at least one backup neuron stored in the second memory block is added to the first model with the original neurons to generate a second model in the neural network for compensating the original neurons of the first model stored in the first memory block by adding the at least one backup neuron to the original neurons of the first model.

19. The control circuit of claim 18, further comprising:
a controller;
a write driver for writing the probing data to the probing memory block controlled by the controller; and
at least one analog to digital converter controlled by the controller,
wherein the at least one analog to digital converter (ADC) is coupled to the probing memory block and the plurality of memory blocks for performing the computation of the neural network controlled by the controller.

20. The control circuit of claim 19, wherein the at least one ADC comprising:
a probing ADC block coupled to the probing memory block and the controller; and
a plurality of ADC blocks coupled to the plurality of memory blocks, respectively, and the controller is couple to the plurality of ADC blocks.

* * * * *